United States Patent
Hsu

(10) Patent No.: US 10,047,913 B1
(45) Date of Patent: Aug. 14, 2018

(54) ILLUMINATING LAMP

(71) Applicant: Dong Guan Bright Yinhuey Lighting Co., Ltd. China, Guang Dong (CN)

(72) Inventor: Kevin Hsu, Taichung (TW)

(73) Assignee: Dong Guan Bright Yinhuey Lighting Do., Ltd. China, Guang Dong (CN)

( * ) Notice: Subject to any disclaimer, the term of this patent is extended or adjusted under 35 U.S.C. 154(b) by 0 days.

(21) Appl. No.: 15/619,597

(22) Filed: Jun. 12, 2017

(51) Int. Cl.
| | |
|---|---|
| *F21V 17/06* | (2006.01) |
| *F21K 9/237* | (2016.01) |
| *F21K 9/66* | (2016.01) |
| *F21Y 107/50* | (2016.01) |
| *H05B 33/08* | (2006.01) |

(52) U.S. Cl.
CPC .............. *F21K 9/237* (2016.08); *F21K 9/66* (2016.08); *F21Y 2107/50* (2016.08); *H05B 33/0803* (2013.01)

(58) Field of Classification Search
CPC ................. F21V 17/06; F21V 15/01

USPC ......................... 362/433, 441, 448
See application file for complete search history.

(56) References Cited

U.S. PATENT DOCUMENTS 1,902,023 A * 3/1933 Gallagher ............... F21V 17/00
362/437
7,053,540 B2 * 5/2006 Bobel ....................... H01J 5/54
362/296.01

* cited by examiner

*Primary Examiner* — William Carter
(74) *Attorney, Agent, or Firm* — Alan D. Kamrath; Kamrath IP Lawfirm, P.A.

(57) ABSTRACT

A lamp includes a base, an actuating power supply, a light source, a lamp tube and a lampshade. The base is provided with a first internal thread and a second internal thread. The actuating power supply is mounted in the base. The light source is mounted in the base. The light source includes a support rack mounted in the base and a plurality of filaments mounted on the support rack and electrically connected with the actuating power supply. The lamp tube is screwed onto the second internal thread of the base and covers the light source. The lampshade is screwed onto the first internal thread of the base and covers the lamp tube.

4 Claims, 4 Drawing Sheets

ILLUMINATING LAMP

BACKGROUND OF THE INVENTION

1. Field of the Invention

The present invention relates to a lamp and, more particularly, to an illuminating lamp.

2. Description of the Related Art

A conventional lamp comprises a base, a light source mounted on the base, and a lampshade mounted onto the base. However, the light source and the lampshade are locked onto the base, so that the model of the lampshade are confined by the lighting type, the lighting position and the lighting angle of the light source, thereby restricting the design of the lampshade. In addition, the type of the light source has to match the model of the lampshade. However, the light source has different types, and the lampshade has different models, so that the consumer cannot match the light source and the lampshade easily. Thus, when the light source and the lampshade do not match each other, the lighting effect is limited.

BRIEF SUMMARY OF THE INVENTION

In accordance with the present invention, there is provided a lamp comprising a base, an actuating power supply, a light source, a lamp tube and a lampshade. The base is provided with a first internal thread and a second internal thread. The first internal thread of the base is located at an outside of the second internal thread. The actuating power supply is mounted in the base. The light source is mounted in the base. The light source includes a support rack mounted in the base and a plurality of filaments mounted on the support rack and electrically connected with the actuating power supply. The lamp tube is screwed onto the second internal thread of the base and covers the light source. The lampshade is screwed onto the first internal thread of the base and covers the lamp tube.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
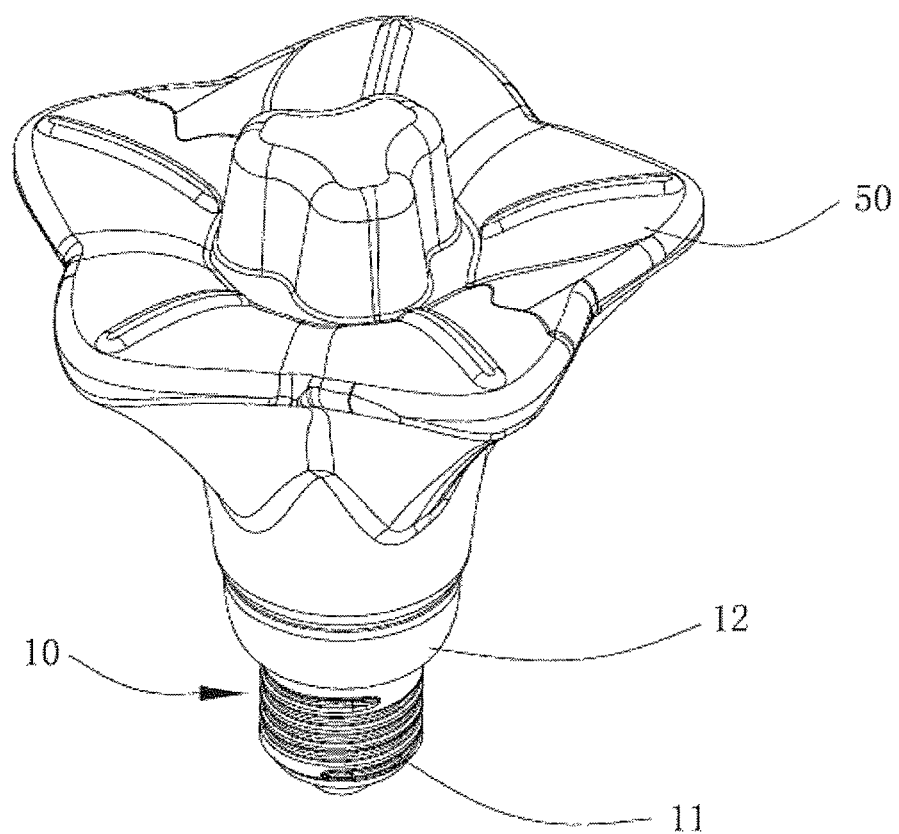
FIG. 1 is a perspective view of a lamp in accordance with the preferred embodiment of the present invention.
Figure 2:
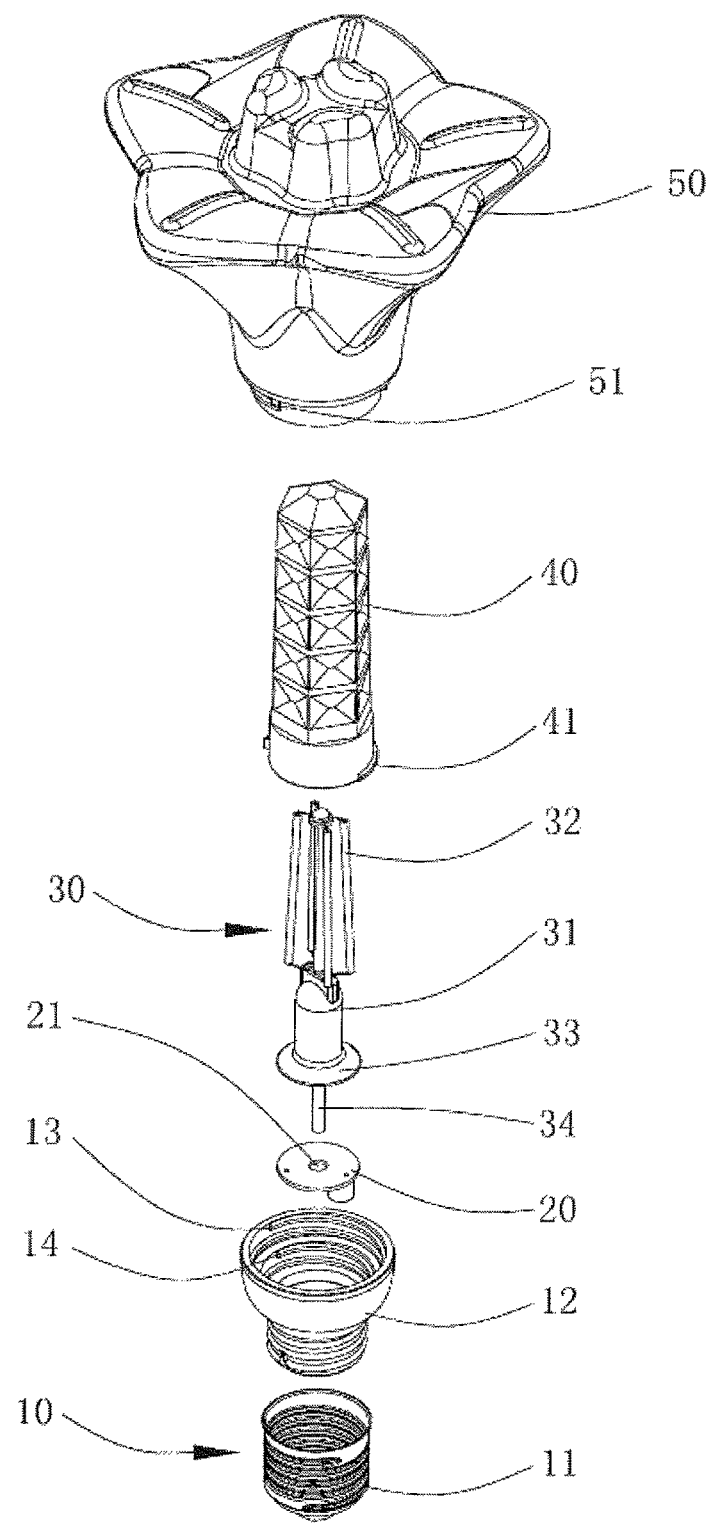
FIG. 2 is an exploded perspective view of the lamp as shown in FIG. 1.

Referring to the drawings and initially to FIGS. 1 and 2, a lamp in accordance with the preferred embodiment of the present invention comprises a base 10, an actuating power supply 20, a light source 30, a lamp tube 40 and a lampshade 50.

The base 10 is provided with a first internal thread 13 and a second internal thread 14. The first internal thread 13 of the base 10 is located at an outside of the second internal thread 14.

The actuating power supply 20 is mounted in the base 10. The actuating power supply 20 actuates operation of the light source 30

The light source 30 is mounted in the base 10 and electrically connected with the actuating power supply 20. The light source 30 includes a support rack 31 mounted in the base 10 and a plurality of filaments 32 mounted on the support rack 31 and electrically connected with the actuating power supply 20. The filaments 32 of the light source 30 are inclined inward from bottom to top. The position of the support rack 31 determines the lighting position of the light source 30, so that the user can adjust the position of the support rack 31 to regulate the lighting position of the filaments 32.

The lamp tube 40 is screwed onto the second internal thread 14 of the base 10 and covers the light source 30. Preferably, the lamp tube 40 has an elongate shape. Preferably, the lamp tube 40 has a mounting portion provided with an external thread 41 screwed into the second internal thread 14 of the base 10. The lamp tube 40 provides the diffusion, light spot, transparent and focus effects to the light source 30. In addition, the lamp tube 40 protects the light source 30 and the actuating power supply 20.

The lampshade 50 is screwed onto the first internal thread 13 of the base 10 and covers the lamp tube 40. Preferably, the lampshade 50 has a mounting portion provided with an external thread 51 screwed into the first internal thread 13 of the base 10.

In the preferred embodiment of the present invention, each of the filaments 32 of the light source 30 is secured on a top of the support rack 31 and has a lower end electrically connected with the actuating power supply 20 by an electric wire (not shown). The electric wire is mounted in the support rack 31.

In the preferred embodiment of the present invention, the actuating power supply 20 has a circular shape and has a central portion provided with a through hole 21, and the support rack 31 of the light source 30 has a bottom provided with a mounting post 34 mounted in the through hole 21 of the actuating power supply 20.

In the preferred embodiment of the present invention, the support rack 31 of the light source 30 is provided with a limit plate 33 located between the mounting post 34 and the filaments 32. The limit plate 33 of the light source 30 is limited on a side face of the actuating power supply 20.

In the preferred embodiment of the present invention, the base 10 includes a housing 11 and a connector 12 screwed into the housing 11, and the first internal thread 13 and the second internal thread 14 of the base 10 are formed in the connector 12. Preferably, the housing 11 has an inner thread, and the connector 12 has an outer thread screwed into the inner thread of the housing 11 to combine the connector 12 with the housing 11. The actuating power supply 20 is mounted in the connector 12 of the base 10.

As shown in FIG. 1, the lampshade 50 has a flower shape.

Figure 3:
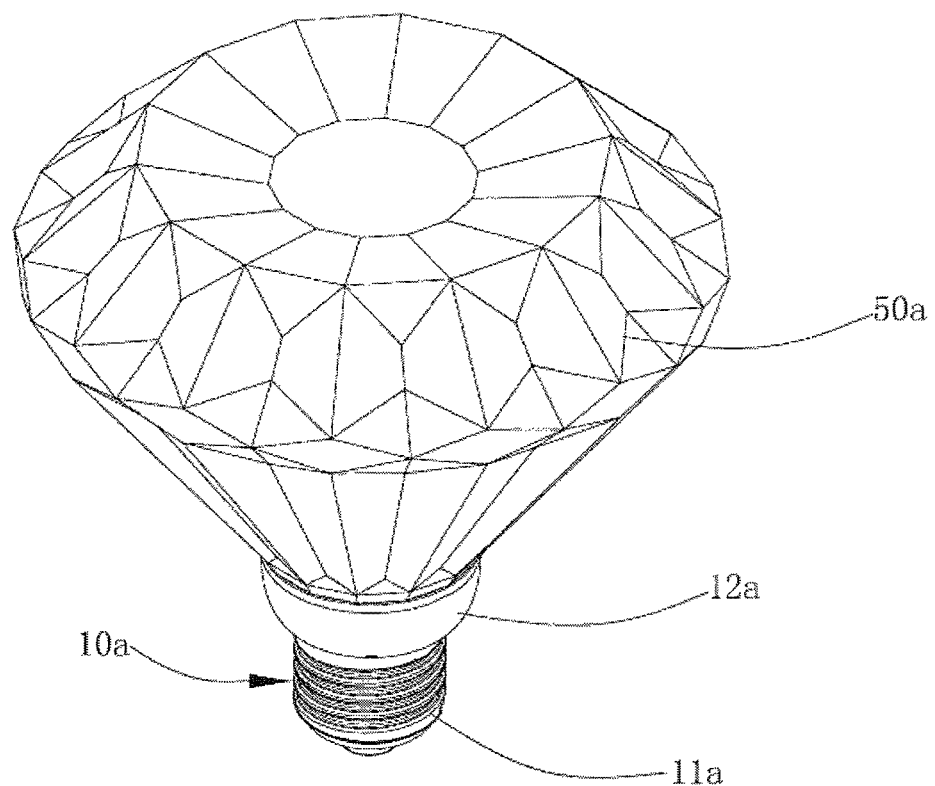
FIG. 3 is a perspective view of a lamp in accordance with another preferred embodiment of the present invention.

As shown in FIG. 3, the housing 11a and the connector 12a of the base 10a have the same structure, and the lampshade 50a has a different shape.

Figure 4:
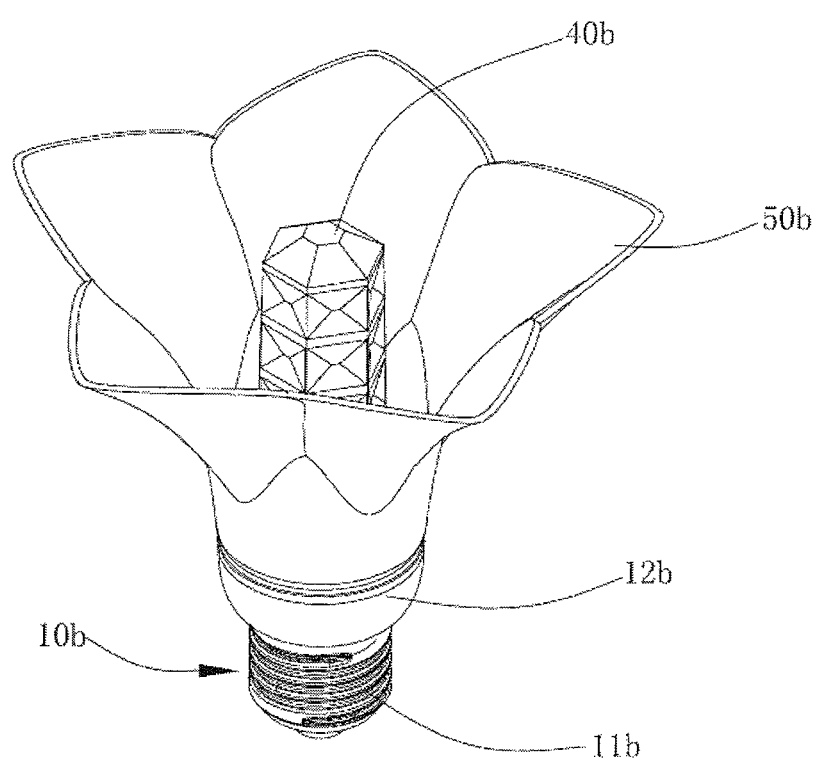
FIG. 4 is a perspective view of a lamp in accordance with a further preferred embodiment of the present invention.

As shown in FIG. 4, the housing 11b and the connector 12b of the base 10b and the lamp tube 40b have the same structure, and the lampshade 50b has a different shape.

Accordingly, the base 10, the actuating power supply 20, the light source 30 and the lamp tube 40 are combined to form an integral light module which satisfies the safety rules and operation requirements. In addition, the lampshade 50 is replaceably mounted on the integral light module to construct the lamp so that the lamp has a lighting function and presents the shape of the lampshade 50 simultaneously. Further, the lighting and illuminating effect of the lampshade 50 is designed and controlled efficiently. Further, the light source 30 and the lampshade 50 are integrated to reduce the restriction of the design and application, to simplify the structure of the lamp, and to reduce the cost of production. Further, the lamp has a simple construction and has a beautiful profile.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A lamp comprising:
   a base, an actuating power supply, a light source, a lamp tube and a lampshade;
   wherein:
   the base is provided with a first internal thread and a second internal thread;
   the first internal thread of the base is located at an outside of the second internal thread;
   the actuating power supply is mounted in the base;
   the light source is mounted in the base;
   the light source includes a support rack mounted in the base and a plurality of filaments mounted on the support rack and electrically connected with the actuating power supply;
   the lamp tube is screwed onto the second internal thread of the base and covers the light source;
   the lampshade is screwed onto the first internal thread of the base and covers the lamp tube;
   the actuating power supply has a central portion provided with a through hole; and
   the support rack of the light source has a bottom provided with a mounting post mounted in the through hole of the actuating power supply.

2. The lamp of claim 1, wherein each of the plurality of filaments of the light source is secured on a top of the support rack and has a lower end electrically connected with the actuating power supply.

3. The lamp of claim 1, wherein the support rack of the light source is provided with a limit plate located between the mounting post and the filaments.

4. The lamp of claim 1, wherein the base includes a housing and a connector screwed into the housing.

* * * * *